May 3, 1927.　　　　W. G. KENDALL　　　　1,626,842
COMPACT HOLDER
Filed Jan. 16, 1925
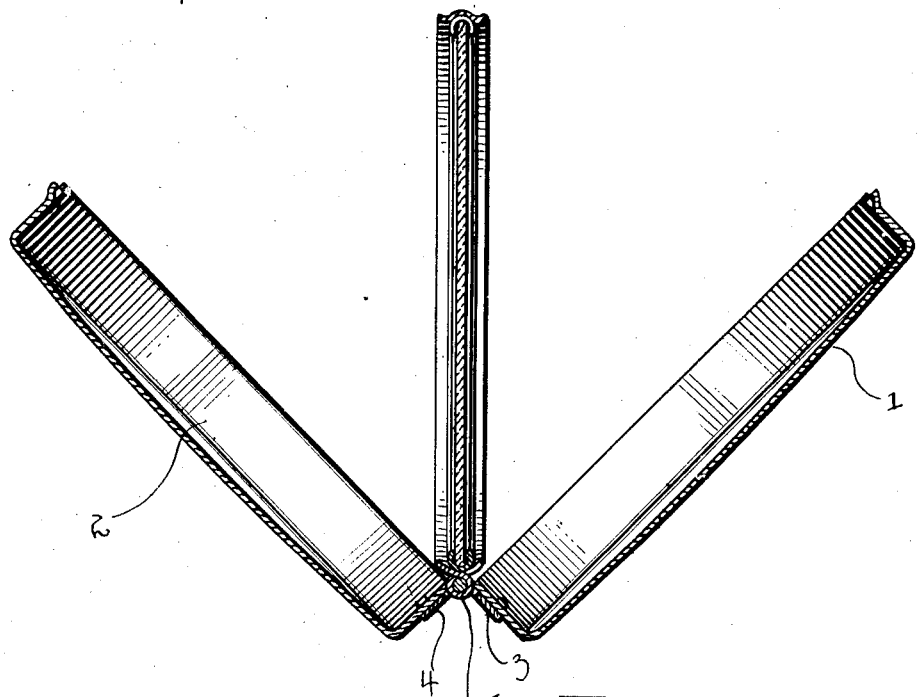
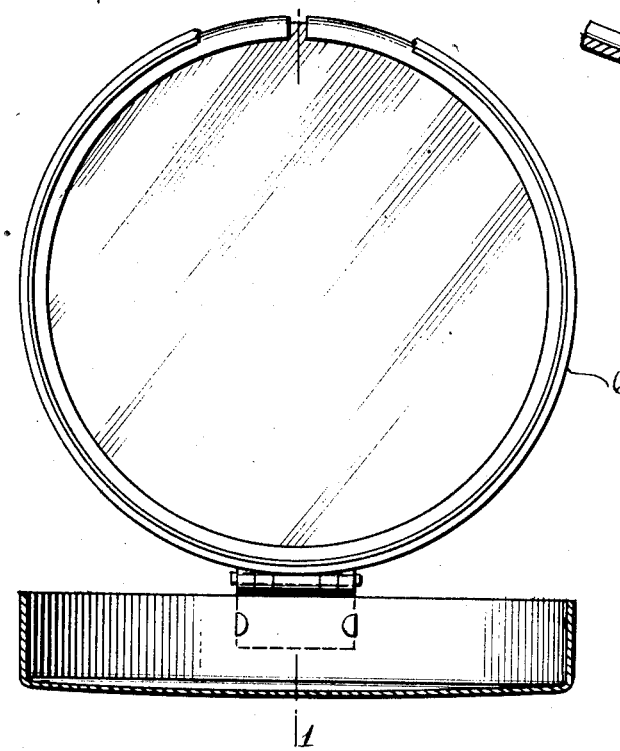
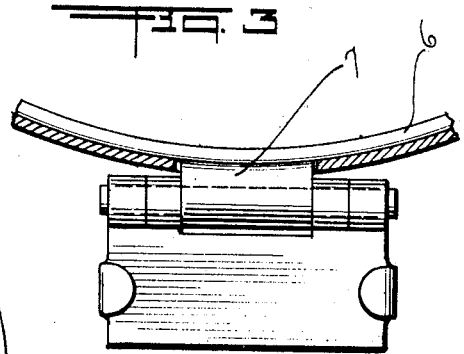
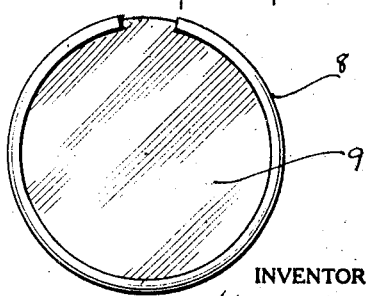
INVENTOR
William G. Kendall
BY Mock & Blum
ATTORNEYS Patented May 3, 1927.                                                                         1,626,842

UNITED STATES PATENT OFFICE.

WILLIAM G. KENDALL, OF NEWARK, NEW JERSEY, ASSIGNOR TO PARFUMERIE RIGAUD, INC., OF NEW YORK, N. Y., A CORPORATION OF NEW YORK.

COMPACT HOLDER.

Application filed January 16, 1925. Serial No. 2,959.

This invention relates to compact holders and more particularly to vanity cases or metal compact holders of the type known as double compacts in which a mirror and a holder for a compact of face powder and rouge is provided.

Further objects of this invention will be apparent from the specification and drawings in which Fig. 1 is a side elevation of my improved holder opened.

Fig. 2 is a vertical elevation of my improved holder showing novel features of the mirror used.

Fig. 3 is an enlarged detail view of the hinge portion of the holder.

Fig. 4 is a detail view of the mirror only.

1 represents the cover, 2 the base of the compact joined to each other by the hinges 3 and 4 which are swiveled upon the pintle 5. To the pintle 5 is also attached the metal ring 6 having integrally formed therein a hinge member 7 which is also swiveled on the pintle 5. The ring 6 is integrally grooved as shown in Fig. 2 so as to receive the split ring 8, which is the holder for the metal mirror 9. It is evident that to insert the metal mirror 9 within the ring 6, the split ring 8 is contracted as much as possible and slipped into the groove in the ring 6. The split ring 8 is made with sufficient resilience so as to readily expand in the groove in the ring 6 and hold the mirror 9 firmly within said groove. The inner ring 8 frictionally grips the outer ring 6 because of the resilience of said inner ring. Since the periphery of the ring 8 is recessed or concave, the mirror is reliably held therein, although the mirror 9 and ring 8 may be readily removed and replaced.

It is a further advantage of this construction that the ring 6 and the hinge member 7 are stamped from one piece and that only a single pintle is necessary to hold both the ring 6 and the bottom and top members 1 and 2. The walls of the base and cover which are directly adjacent the hinge, may, for convenience, be designated as the vertical walls of the holder.

As seen in Fig. 1, the periphery of the ring 6 has the hinge member 7 bent out therefrom and curved to form a loop, through which the hinge pintle passes.

Having fully described my invention, what I claim is:

A vanity case comprising two body portions and an intermediate ring all mounted upon the same hinge pintle; said ring having a groove in the wall thereof, the width of said groove being less than the width of said wall, a partition member held in a split ring held in said groove, a portion of one side of the lateral periphery of said ring being bent out transversely and curved to form a loop for said hinge pintle.

In testimony whereof I hereunto affix my signature.

WILLIAM G. KENDALL.